United States Patent Office 2,995,591
Patented Aug. 8, 1961

2,995,591
ALKOXYDISILOXANES
Steve A. Kovacich, El Cerrito, and Robert L. Peeler, Albany, Calif., assignors to California Research Corporation, San Francisco, Calif., a corporation of Delaware
No Drawing. Filed June 30, 1958, Ser. No. 745,327
3 Claims. (Cl. 260—448.8)

This invention relates to novel alkoxydisiloxanes. More particularly, the invention is concerned with a novel class of dialkyldialkoxyditertiaryalkoxydisiloxanes having improved properties.

Alkoxydisiloxanes are generally characterized by unusually good viscosity-temperature properties, superior lubricity and low volatility which make them attractive as high temperature hydraulic fluids and lubricants. A great many of the alkoxydisiloxanes, however, are unstable, particularly at high temperatures and in the presence of water. This instability makes them objectionable for a number of important uses.

We have now discovered a novel class of alkoxydisiloxanes having improved properties, namely, the dialkyldialkoxyditertiaryalkoxydisiloxanes wherein the alkyl groups contain from 1 to 12 carbon atoms each, the alkoxy groups contain from 3 to 13 carbon atoms each, and the tertiary alkoxy groups contain from 4 to 8 carbon atoms each.

The alkoxydisiloxanes of the present invention possess outstanding properties which are considered desirable for hydraulic fluids and lubricants. Their hydrolytic stability is excellent, particularly at high temperatures, and this, as stated above, is unusual for alkoxydisiloxanes. They are also low in volatility and have excellent viscosity-temperature properties, which permit their effective use over a wide range of temperatures.

The dialkyldialkoxyditertiaryalkoxydisiloxanes of the invention are illustrated by the following structural formula:

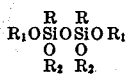

wherein the R is an alkyl group of from 1 to 12 carbon atoms, the $R_1$'s, which may be the same or different from one another, are alkyl groups of from 3 to 13 carbon atoms, and the $R_2$'s, which may be the same or different from one another, are tertiary alkyl groups of from 4 to 8 carbon atoms. Preferably, the R's are alkyl groups of from 1 to 6 carbon atoms, the $R_1$'s are primary or secondary alkyl groups of from 3 to 10 carbon atoms, and the $R_2$'s are tertiary alkyl groups of from 4 to 6 carbon atoms. Such preferred alkyl groups provide dialkyldialkoxyditertiaryalkoxydisiloxanes which are unusually stable at high temperatures and in the presence of water.

Dialkyldialkoxyditertiaryalkoxydisiloxanes illustrative of the invention, as described above, include:

1,3-dimethyl - 1,3 - di(tert - butoxy) - 1,3 - di(1-octoxy)-disiloxane
1,3-dimethyl - 1,3 - di(tert-butoxy) - 1,3 - di(isodecoxy)-disiloxane
1,3-dimethyl - 1,3 - di(tert - butoxy) - 1,3 - di(5-ethyl-2-nonoxy)-disiloxane
1,3-dimethyl - 1,3-di(tert-pentoxy)-1,3-di(2-ethylhexoxy)-disiloxane
1,3-diethyl-1,3-di(tert - butoxy) - 1,3-di(2 - ethylhexoxy)-disiloxane
1,3-diethyl-1,3 - di(tert - pentoxy)-1,3-di(2-ethylbutoxy)-disiloxane The novel dialkyldialkoxyditertiaryalkoxydisiloxanes of the invention are prepared by several different methods. According to one method, one mole of commercially available alkyltrichlorosilane is reacted with one mole of alcohol, the alkyl groups of the silane and alcohol being of the type mentioned above. The alkylalkoxydichlorosilane thus obtained is then reacted with one mole of a tertiary alkyl alcohol in the presence of an acid acceptor such as α-picoline or pyridine. Two moles of the alkylalkoxytertiaryalkoxymonochlorosilane from this reaction is reacted with one mole of water in the presence of acid acceptor to give the dialkyldialkoxyditertiaryalkoxydisiloxane. Cooling of the reaction mixture is usually employed in the first step to control the rate of the reaction. Following the initial step of the reaction, heating is employed, usually at the reflux temperatures of the alcohol mixture, to accelerate the reaction. Hydrogen chloride formed as a by-product in the reaction in the initial step is readily removed by blowing with an inert gas, such as nitrogen. In the second step of the reaction, the hydrogen chloride-acid acceptor salt is separated from the reaction mixture by conventional means, such as filtration or decanting.

The following examples are given as additional illustrations of the preparation of the novel dialkyldialkoxyditertiaryalkoxydisiloxanes of the invention. Unless otherwise specified, proportions are given on a weight basis.

EXAMPLE 1

454 grams of ethyltrichlorosilane was dissolved in 250 ml. toluene and added to a 2-liter reaction flask. The mixture was cooled to —20° C. and held at that temperature while 284 grams of 2-ethylbutanol was added dropwise. Hydrogen chloride gas was evolved during the reaction. After one additional hour at this temperature, the reaction mixture was allowed to come to room temperature overnight. Any hydrogen chloride by-product remaining in the mixture was removed by blowing with nitrogen for one-half hour. Toluene was stripped off and a product identified as ethyl-2-ethylbutoxydichlorosilane was collected by distillation at 95 to 102° C. vapor temperature under 14.7 mm. Hg pressure. To 372 grams of this dichlorosilane in a 2-liter reaction flask was added 175 ml. α-picoline and 200 ml. toluene. This mixture was cooled to 0° C. and a mixture of 143 grams tert-pentyl alcohol, 175 ml. α-picoline acid acceptor and 200 ml. toluene was added at this temperature over a period of two hours. The reaction mixture was allowed to come to room temperature overnight. It was then refluxed four hours at 126° C. After cooling to room temperature, 14.6 ml. water was added dropwise, a maximum temperature of 38° C. being reached. The mixture was then heated three hours at 100 to 106° C. After cooling to room temperature, 600 ml. of water was added and stirred until all α-picoline·HCl salt formed in the reaction had dissolved. The mixture was allowed to stand and the aqueous phase discharded. The product layer was washed three times with 600 ml. water and dried over anhydrous sodium sulfate. The product was distilled at 1 mm. Hg pressure in a spinning band column. The fraction boiling between 150 and 162° C. was collected as 1,3-diethyl-1,3-di(tert-pentoxy)-1,3-di(2-ethylbutoxy)disiloxane.

Additional preparations of the dialkyldialkyoxyditertiaryalkoxydisiloxanes according to the invention and related material for the purpose of comparison were carried out, employing the procedures as outlined above. The properties of these alkoxydisiloxanes are summarized in the following table:

Table I

| Example No. | Compound | Boiling point, °C./mm. | Viscosity, cs. 100° F. | Viscosity, cs. 210° F. | ASTM slope, 100/210° F. | Silicon, percent Found | Silicon, percent Calc. | Carbon, percent Found | Carbon, percent Calc. | Hydrogen, percent Found | Hydrogen, percent Calc. |
| --- | --- | --- | --- | --- | --- | --- | --- | --- | --- | --- | --- |
| 1 | 1,3-diethyl-1,3-di(tert-pentoxy)-1,3-di(2-ethylbutoxy)disiloxane. | 150–162/1 | 6.46 | 1.96 | 0.80 | | | 61.75 | 61.60 | 11.80 | 11.53 |
| 2 | 1,3-dimethyl-1,3-di(tert-butoxy)1,3-di(1-octoxy)disiloxane. | 172–174/1 | 5.41 | 1.94 | | 10.99 | 11.08 | 61.42 | 61.60 | 11.39 | 11.53 |
| 3 | 1,3-dimethyl-1,3-di(tert-butoxy)-1,3-di(5-ethyl-2-nonoxy)disiloxane. | 194–199/1 | 10.45 | 2.887 | 0.72 | 9.35 | 9.50 | 64.75 | 65.03 | 12.15 | 11.94 |
| 4 | 1,3-dimethyl-1,3-di(tert-pentoxy)-1,3-di(2-ethylhexoxy)disiloxane. | 169–176/1 | 6.58 | 2.27 | 0.69 | 10.61 | 10.50 | 62.63 | 62.86 | 11.41 | 11.68 |
| 5 | 1,3-diethyl-1,3-di(tertbutoxy)-1,3-di(2-ethylhexoxy)disiloxane. | 171–178/1 | 7.234 | 2.201 | 0.76 | 9.80 | 10.50 | 62.52 | 62.86 | 11.93 | 11.68 |
| 6 | 1,1,3,3-tetramethyl-1,3-di(1-decoxy)-disiloxane. | 176–179/1 | 4.950 | 1.887 | 0.70 | 12.1 | 12.57 | 63.95 | 64.51 | 11.95 | 12.18 |
| 7 | 1,3-diethyl-1,1,3,3-tetra-(2-ethylbutoxy)-disiloxane. | 179–181/1 | 5.852 | 2.285 | 0.63 | 9.79 | 10.50 | | | | |

In the above examples, the tetramethyldialkoxydisiloxane of Example 6 and the diethyltetraalkoxydisiloxane of Example 7 were prepared for the purpose of comparative evaluation. The alkoxydisiloxanes of the present invention, as described above, are all characterized by two alkyl groups, one being attached to each of the silicon atoms of the disiloxane. They also contain two tertiaryalkoxyl groups, one for each silicon. The remaining alkoxy group on each of the silicon atoms may be primary or secondary in nature, as described above, or it may be an additional tertiary alkoxy group. The following example illustrates the preparation of a dialkyltetraalkoxydisiloxane in which the alkoxy groups are all tertiary alkoxy groups containing from 4 to 8 carbon atoms.

EXAMPLE 8

400 ml. of nonyldi-t-butoxychlorosilane (prepared by the reaction of nonyltrichlorosilane with t-butyl alcohol in the presence of α-picoline) were added to a reaction flask along with 100 ml. α-picoline. Keeping the temperature between 40° C. and 60° C., a mixture of 80 ml. α-picoline and 80 ml. water was gradually added. The mixture was held at this temperature for one hour and then refluxed for two hours. After cooling, the aqueous layer was discarded and the product washed five times with water. It was then driew with anhydride sodium sulfate, filtered and distilled through a spinning band column. The product boiling between 205° C. and 217° C. at 1 mm. was collected as 1,3-dinonyl-1,1,3,3-tetra(t-butoxy)disiloxane.

A series of tests was carried out to illustrate the superior properties of the novel dialkyldialkoxyditertiaryalkoxydisiloxanes. These tests show the excellent hydrolytic stability at elevated temperatures compared to other silicate esters of the same general type. In the tests, 10.00 ml. of the alkoxydisiloxane and 0.60 ml. of water are placed in a 22 ml. nickel bomb. The bomb is closed and rotated at 5 r.p.m. in an oven maintained at 400° F. At the end of twenty hours, the bomb is removed from the oven. The test fluid is taken from the bomb and centrifuged. Following centrifugation, the liquid portion is decanted for viscosity measurements, insolubles remaining after decanting are washed with chloroform, dried and weighed.

The results of twenty hour tests on the dialkyldialkoxyditertiaryalkoxydisiloxanes of the invention are given at the following table. For comparison, test results are also included in the table showing the hydrolytic stability of other types of alkoxydisiloxanes.

Table II

| Compound | Viscosity, 100° F. | Change, Percent 210° F. | Insolubles, Percent |
| --- | --- | --- | --- |
| 1,3-dimethyl-1,3-di(tert-butoxy)-1,3-di-(1-octoxy)-disiloxane | +0.4 | −5.5 | 0.13 |
| 1,3-dimethyl-1,3-di(tert-butoxy)-1,3-di-(isodecoxy)disiloxane | −9.7 | −3.9 | 0.26 |
| 1,3-dimethyl-1,3-di(tert-butoxy)-1,3-di-(5-ethyl-2-nonoxy)disiloxane | −9.1 | −8.5 | 0.19 |
| 1,3-dimethyl-1,3-di(tert-pentoxy)-1,3-di-(2-ethylhexoxy)disiloxane | −4.6 | −7.9 | 0.04 |
| 1,3-diethyl-1,3-di(tert-butoxy)-1,3-di-(2-ethylhexoxy)disiloxane | +0.5 | −4.5 | Nil |
| 1,3-diethyl-1,3-di(tert-pentoxy)-1,3-di-(2-ethylbutoxy)disiloxane | +4.1 | −1.8 | 0.02 |
| Hexa(2-ethylbutoxy)disiloxane | | −51.4 | 14.1 |
| 1,3-dimethyl-1,1,3,3-tetra(2,2-dimethylpentoxy)-disiloxane | +211 | +61.7 | 0.65 |
| 1,3-diethyl-1,1,3,3-tetra(2-ethylbutoxy)-disiloxane | +17.3 | −20.0 | 0.01 |
| 1,1,3,3-tetramethyl-1,3-di(1-decoxy)-disiloxane | +52.5 | −3.2 | Nil |

From the above test results it will be seen that the dialkyldialkoxyditertiaryalkoxydisiloxanes of the present invention are quite stable to hydrolysis at high temperatures. There is very little change in the viscosity of the dialkyltetraalkoxydisiloxanes after the prolonged heating at 400° F. in the presence of water. Furthermore, there is very little formation of insolubles. By way of contrast, hexaalkoxydisiloxanes, diphenyldialkoxyditertiaryalkoxydisiloxanes, and tetramethyldialkoxydisiloxanes are shown to be much less stable. Undesirably, large changes in viscosity are sustained with such fluids, or the formation of insolubles is unsatisfactorily high in each instance. The alkoxydisiloxanes of the present invention having tertiaryalkoxy groups are also characterized by better hydrolytic stabilities than the corresponding dialkyltetraalkoxydisiloxanes without tertiaryalkoxy groups, although the latter compounds are unusually stable compared to ordinary hexaalkoxydisiloxanes.

The usual stability of the dialkyldialkoxyditertiary, alkoxydisiloxanes according to the present invention makes them particularly valuable as hydraulic fluids and lubricants in applications where high temperatures are encountered. The fact that they maintain excellent viscosity-temperatures properties is especially important, since minimum viscosity changes throughout wide temperature ranges are required. Resistance to the formation of insoluble particles of silica is also critical, since such abrasive materials obviously interfere with proper functioning of hydraulic and lubrication systems.

We claim:
1. Dialkyldialkoxyditertiaryalkoxydisiloxane having the general structural formula:

wherein the R is a straight-chain alkyl group of from 1 to 6 carbon atoms, the $R_1$'s are selected from the class consisting of primary and secondary alkyl groups of from 3 to 10 carbon atoms each, and the $R_2$'s are tertiaryalkyl groups of from 4 to 6 carbon atoms each.

2. 1,3-diethyl-1,3-di(tert-pentoxy)-1,3-di(2-ethylbutoxy)disiloxane.

3. 1,3-dimethyl-1,3-di(tert-pentoxy)-1,3-di(2-ethylhexoxy)-disiloxane.

References Cited in the file of this patent

UNITED STATES PATENTS

| | | |
|---|---|---|
| 2,566,365 | Pedlow et al. | Sept. 4, 1951 |
| 2,624,749 | Bunnell | Jan. 6, 1953 |
| 2,717,242 | Foehr | Sept. 6, 1955 |
| 2,758,127 | Goldschmidt et al. | Aug. 7, 1956 |

OTHER REFERENCES

Okawara et al.: "Bull. Chem. Soc. Japan," vol. 27 (1954), pp. 582–5; (Chem. Abstracts, vol. 50 (1956), pp. 162–3).

Smith: "Chemical Abstracts," vol. 49 (1955), pp. 909–10.

Peeler et al.: "Ind. & Eng. Chem.," vol. 51 (1959), pp. 749–52.